United States Patent [19]

Fukuhara

[11] 4,179,202

[45] Dec. 18, 1979

[54] DIAPHRAGM APERTURE CONTROL DEVICE IN A CAMERA

[75] Inventor: Toru Fukuhara, Isehara, Japan

[73] Assignee: Nippon Kogaku K.K., Tokyo, Japan

[21] Appl. No.: 945,117

[22] Filed: Sep. 25, 1978

[30] Foreign Application Priority Data

Sep. 29, 1977 [JP] Japan .............................. 52-116156

[51] Int. Cl.² .............................................. G03B 7/08
[52] U.S. Cl. .................................................... 354/43
[58] Field of Search ........................ 354/43, 60 R, 271

[56] References Cited

U.S. PATENT DOCUMENTS 3,987,460 10/1976 Ueda et al. .............................. 354/43

*Primary Examiner*—Michael L. Gellner
*Attorney, Agent, or Firm*—Fitzpatrick, Cella, Harper & Scinto

[57] ABSTRACT

An automatic diaphragm aperture control device used with a camera having an objective lens, a diaphragm having a diaphragm aperture, a shutter mechanism and a shutter speed selecting mechanism. The diaphragm control device includes: means for stopping down the diaphragm from its open position prior to the commencement of exposure in association with a shutter releasing operation; light measuring means for measuring the light passing through the objective lens and the diaphragm aperture and for producing an output signal indicative of such measurement; output means providing an output signal commensurate to a shutter speed selected by the shutter speed selecting mechanism; locking means for determining a diaphragm aperture by locking said means for stopping down the diaphragm so as to stop its stopping down operation; correction signal generating means putting out a primary differentiation signal resulting from the time-differentiation of the output signal of at least said light measuring means; and comparator means receiving as input the output signals from said light measuring means, said output means and said correction signal means and operating said locking means when said three signals assume a relationship providing a proper diaphragm aperture. The improvement of the diaphragm control device reside in that said correction signal generating means further puts out a secondary differentiation signal resulting from secondary time differentiation of the output signal of said light measuring means.

3 Claims, 5 Drawing Figures

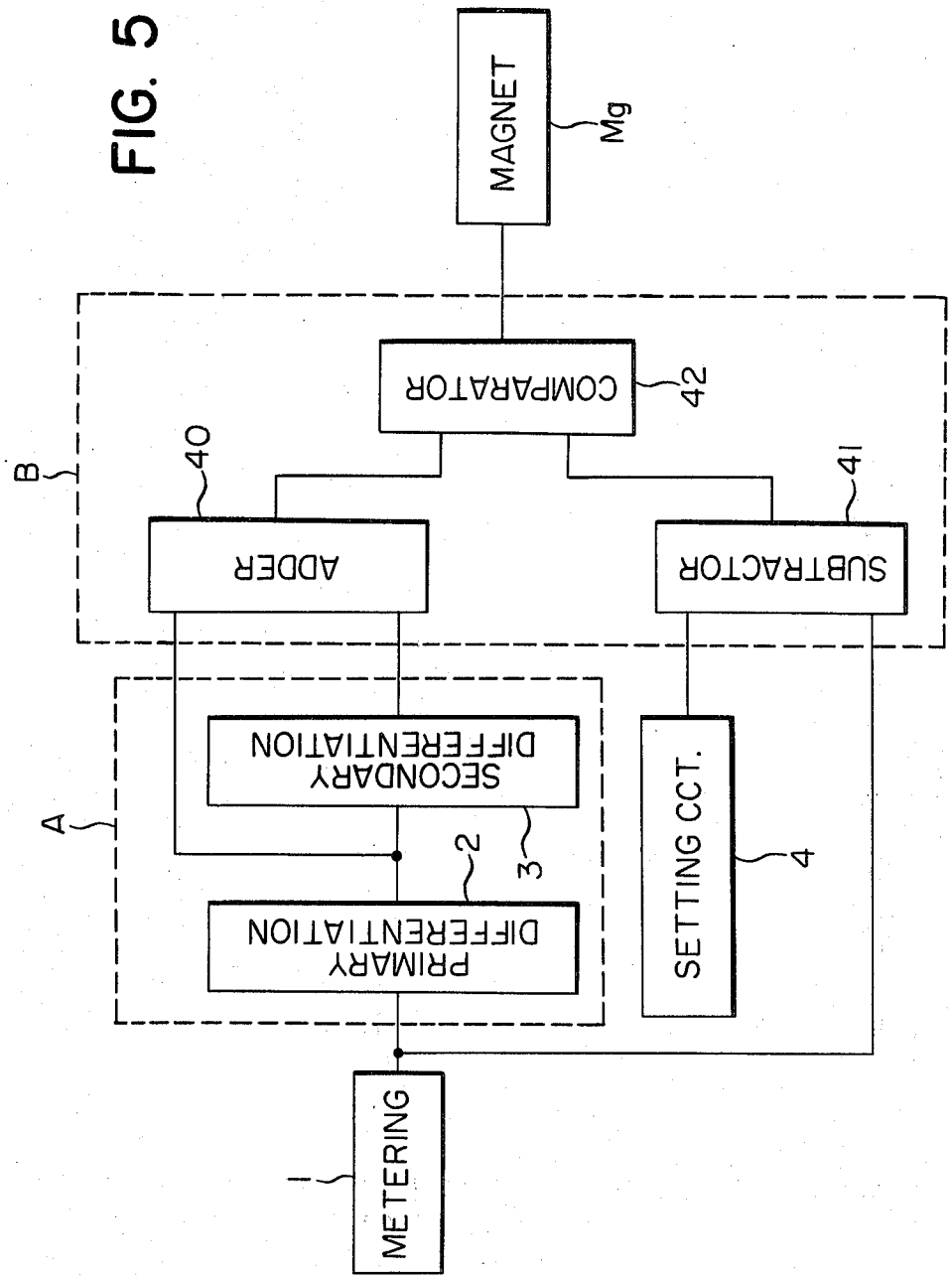

DIAPHRAGM APERTURE CONTROL DEVICE IN A CAMERA

BACKGROUND OF THE INVENTION

1. Field of the Invention

This invention relates to a diaphragm aperture control device in a camera for automatically controlling the aperture value of an objective lens in accordance with the brightness of the object to be photographed, the shutter speed and the film sensitivity.

2. Description of the Prior Art

This camera is of the type which has an EE function of the shutter speed first and in which the object light passing through the diaphragm aperture is measured while the diaphragm aperture is stopped down from its open position prior to the commencement of exposure in association with a shutter releasing operation, and the stop down operation is stopped to control the aperture to a proper value when the metering output has reached a predetermined value.

However, when the stop down operation of the diaphragm aperture is stopped by a locking member, there is a time delay in the operation of an electromagnetic mechanism for operating the locking member by reason of the fact that the metering output has reached a predetermined value and a delay in the operation of the mechanical part including the locking member, so that there is a disadvantage that the aperture is stopped down more than a proper value by the time delay $\Delta t$.

Therefore, in order properly to control the aperture value, in a device wherein, for example, an electromagnet is demagnetized to drive the locking member, the time whereat the magnet is demagnetized may be earlier by the delay time $\Delta t$. In such a device, the magnet is demagnetized by previously examining a reference level whereat the magnet is to be demagnetized from the metering output characteristic and when the metering output has assumed that reference level. However, the reference level is not constant depending on the speed at which the aperture is stopped down, namely, the speed of variation of the metering output and accordingly, the time from the commencement of the stop down of the aperture till the demagnetization of the electromagnet cannot be accurately determined.

As a solution to this problem, there has heretofore been proposed a device in which a differentiated output of the metering circuit is used for the correction thereof. Such a device calculates (1) a voltage $V'$, namely, $$V' = (dV/dt)_{t=t'} \cdot \Delta t$$

proportional to the primary differentiation value of the metering output $V$ at each time, in order to detect the speed of variation of the quantity of object light passing through the aperture opening by obtaining a voltage corresponding to the variation with time of the metering output. In the above equation, $\Delta t$ is the aforementioned time delay, (2) a level correction value $\Delta V'$ which incorporates therein the acceleration of the variation of the quantity of object light, namely, $$\Delta V' = (\Delta t^2)$$

is previously given, where k is constant. The two are added together and when the following equation (1) is established at a certain time $t_1$, the electromagnet is demagnetized.

$$V_1 = VS + (dV/dt)_{t=t_1} \cdot \Delta t + \Delta V' \quad (1)$$

where $V_1$: metering output at time $t_1$ $VS$: set voltage by the setting of the shutter speed and film sensitivity In other words, when stop down is effected, the aperture diameter is gradually reduced from its open position so that the metering output is also gradually reduced. Accordingly, by increasing the set voltage $V_s$ by a voltage $V'$ proportional to the differentiation value of the metering output and the level correction value $\Delta V'$, the electromagnet is demagnetized earlier by that value. It is after lapse of the delay time $\Delta t$ that the stop down operation is actually stopped after demagnetization of the electromagnet, and the aperture value is controlled when it substantially approaches a proper value.

However, the metering output is slowly varied where the aperture is near the open position and is sharply varied as the aperture is stopped down because (1) the movement of the stop down lever for the objective lens is varied in proportion to the diameter of the aperture opening, namely, the amount of movement of the stop down lever per step of aperture is smaller as the stop down progresses and (2) due to the construction of the stop down lever which is pulled on in one direction by a spring, the movement of the stop down lever after the stop down lever has been released from its restraint is accelerated by the movement thereof until it is stopped by a locking member. Therefore, the variation of the metering output includes an acceleration component even if setting is effected so that equation (1) is established at a certain aperture value as has been done in the prior art, and the term $\Delta V'$ in equation (1) is a value which is variable with variation in aperture value, and this has led to a disadvantage that accurate correction cannot be achieved by another aperture value.

Also, in a camera wherein the lens is interchangeable, the relation between the aperture opening of the objective lens and the amount of movement of the stop down lever is not constant because of a large or a small aperture opening for the same aperture value depending on the type of the objective lens (for example, telephoto lens or wide angle lens), there is irregularity in the relation between the metering output and the lapse of time for the stop down.

In a camera exhibiting such a characteristic, if control is effected by the conventional control device described hitherto, substantially proper control may be achieved for one objective lens but the following problem arises in other type of objective lens. If adjustment is effected so that substantially proper control can be achieved by a standard lens under an object light, the metering output is sharply varied in an objective lens having the same aperture value as the standard lens but having a smaller aperture diameter than the standard lens, so that the aperture opening is greatly varied within the delay time $\Delta t$. Therefore, the level correcting output $\Delta V'$ must be great and the time for stopping the stop down must be earlier, otherwise there can occur under-exposure resulting from excessive stop down. On the other hand, in an objective lens having the same aperture value as the standard lens but having a greater aperture diameter than the standard lens, the metering output is slowly varied so that the aperture diameter is not so much varied within the delay time $\Delta t$. Therefore, the aforementioned level correcting output $\Delta V'$ must be small and the time for stopping the stop down must be delayed, otherwise there can occur over-exposure resulting from insufficient stop down. That is, in the prior art device, the aforementioned level correcting output $\Delta V'$ must be adjusted depending on the type of objective lens in use.

SUMMARY OF THE INVENTION

It is an object of the present invention to provide a diaphragm aperture control device in a camera which eliminates the disadvantage attributable to the time delay when obtaining a proper aperture value.

The invention will become more fully apparent from the following detailed description thereof taken in conjunction with the accompanying drawings.

BRIEF DESCRIPTION OF THE DRAWINGS

FIG. 5 is a block diagram showing another embodiment of the present invention.

DESCRIPTION OF THE PREFERRED EMBODIMENTS

Figure 1:
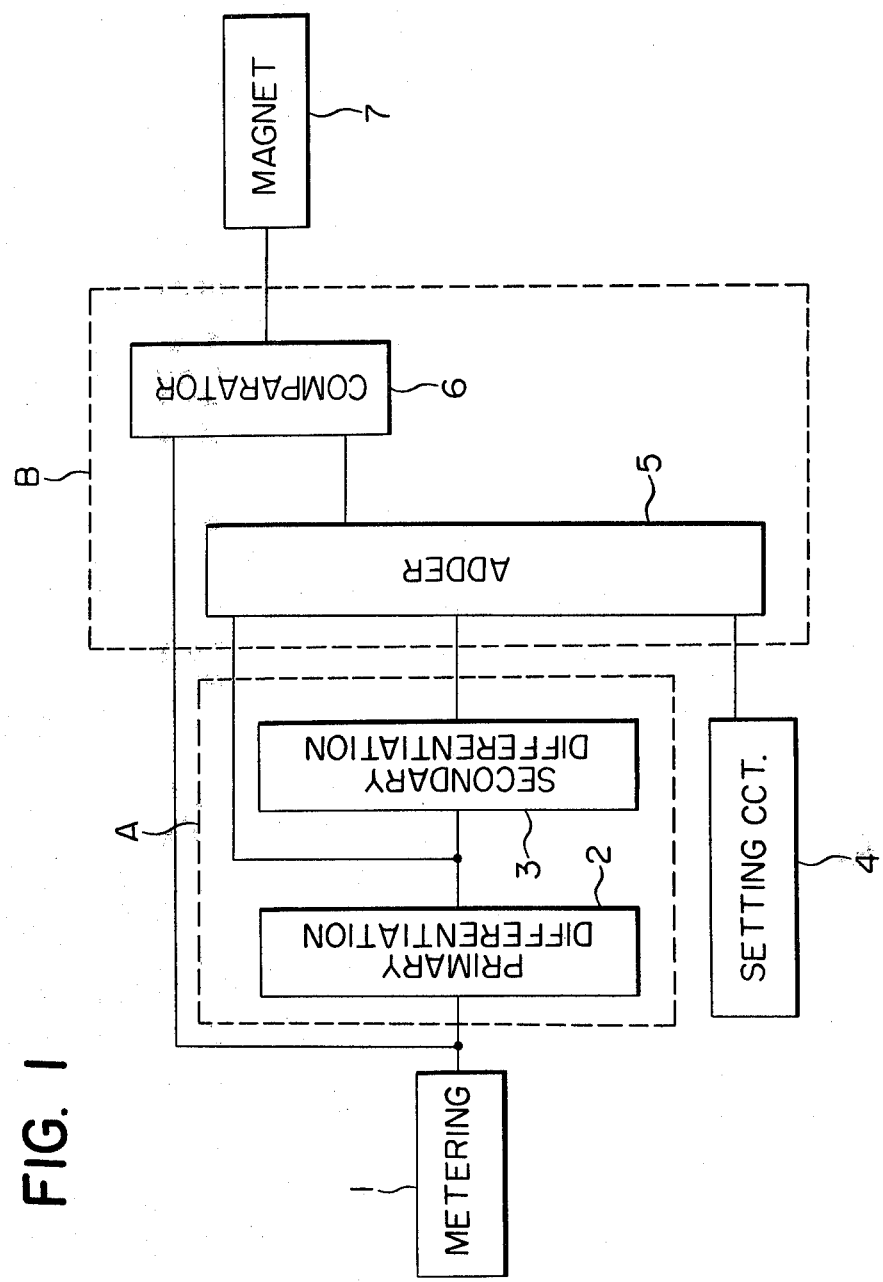
FIG. 1 is a block diagram showing an embodiment of the diaphragm aperture control device according to the present invention.

Referring to FIG. 1, it is a block diagram showing the construction of the present invention. A metering circuit 1 including a light-receiving element produces metering output corresponding to the object light passed through an aperture opening. A primary differentiation circuit 2 produces a primary differentiation output proportional to the value of the metering output differentiated with time. A secondary differentiation circuit 3 produces a secondary differentiation output proportional to the further differentiated value of the primary differentiation output. The primary differentiation circuit 2 and the secondary differentiation circuit 3 together constitute correction signal generating means A. A setting circuit 4 produces a setting output corresponding to the setting of a shutter speed selected by a shutter dial of the camera, the film sensitivity of the film loaded in the camera, etc. An adder circuit 5 adds together the primary differentiation output, the secondary differentiation output and the setting output and applies the sum to one input terminal of a comparator circuit 6. To the other input terminal of the comparator circuit 6 is applied the metering output. The comparator circuit 6 drives an electromagnet Mg when the two input signals applied thereto have established a predetermined relationship. The adder circuit 5 and the comparator circuit 6 together constitute comparator means B. Thus, a locking member (not shown) energized by the electromagnet Mg stops the stop down operation.

Figure 2:
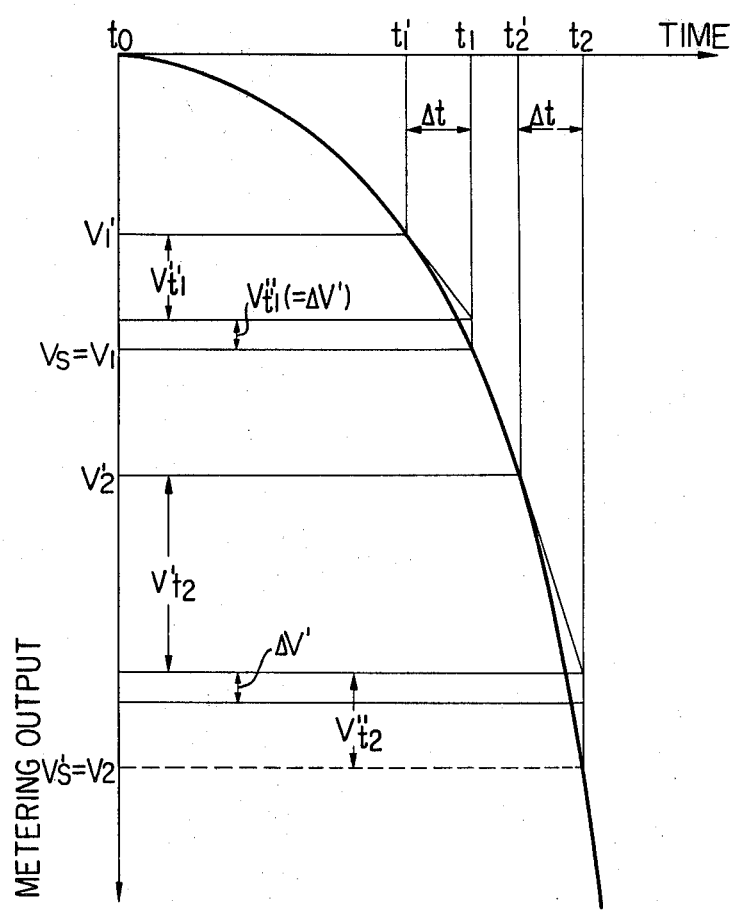
FIGS. 2 and 3 are graphs illustrating the relation between the metering output and the lapse of time.

As the aperture is stopped down from its open condition by depression of an unshown shutter button under a certain object light, the metering voltage V of the metering circuit 1 begins to gradually decrease and is varied as shown in FIG. 2. In FIG. 2, the ordinate represents the metering voltage when the aperture is open (time $t_0$) (this metering voltage is the maximum value) as the reference, and the abscissa represents the lapse of time after the aperture lever is released at time $t_0$ to stop down the aperture. As the output of the primary differentiation circuit 2, a voltage $V't = dV/dt \cdot \Delta t$ which is proportional to the primary differentiation value of the metering voltage which is a value corresponding to the speed of variation in quantity of the object light passing through the aperture opening is produced and, as the output of the secondary differentiation circuit 3, a voltage $V''t = \frac{1}{2}(\Delta t)^2 \cdot (d^2V/dt^2)$ which is proportional to the secondary differentiation value of the metering voltage which is a value corresponding to the acceleration of variation in quantity of the object light passing through the aperture opening is produced. The adder circuit 5 adds together the voltages proportional to the primary and the secondary differentiation value of the metering voltage, respectively, and the voltage set by the setting circuit 4. Therefore, the comparator circuit 6 produces a signal for driving the electromagnet Mg earlier by an amount corresponding to the correction voltage $V't + V''t$ than the metering voltage becomes a proper value VS. That is, when the metering voltage V becomes $VS + V't + V''t$, the comparator circuit 6 produces a signal for driving the electromagnet Mg and at $\Delta t$ thereafter, namely, when the metering voltage V has become a proper value VS, the stop down of the aperture is actually stopped. That is, in FIG. 2, the voltage resulting from the voltage $V't'_1 = (dV/dt \Delta t)_{t=t'_1}$ proportional to the primary differentiation value of the metering voltage at time $t'_1$ and the voltage $V''t'_1 = \frac{1}{2}(\Delta t)^2 \cdot (d^2V/dt^2)_{t=t'_1}$ proportional to the secondary differentiation value of the metering voltage, added to the proper voltage VS, becomes a metering voltage $V'_1$ at time $t'_1$ which is earlier by the delay time $\Delta t$ than the time $t_1$ whereat the metering voltage provides the proper voltage VS and therefore, the comparator circuit 6 of FIG. 1 produces a signal for driving the electromagnet Mg at time $t'_1$, and the actual stop down of the aperture is stopped when the metering voltage has reached the proper voltage VS. Also, if the shutter speed set by the setting circuit 4 is set to a slow value, the metering voltage becomes a value stopped down from the aperture value at a voltage $V_1$, for example, an aperture value at a voltage $V_2$. Again in this case, the voltage resulting from the voltage $V't'_2 = (dV/dt \Delta t)_{t=t'_2}$ proportional to the primary differentiation value of the metering voltage at time $t'_2$ and the voltage $V''t'_2 = \frac{1}{2}(\Delta t)^2 \cdot (d^2V/dt^2)_{t=t'_2}$ proportional to the secondary differentiation value of the metering voltage, added to the proper voltage V'S becomes a metering voltage $V_2'$ at time $t_2'$ whereat the metering voltage provides the proper voltage VS'. In the prior art device, if, for example, a constant voltage V' is set equal to a voltage $V''t'_1$ proportional to the secondary differentiation value of the metering voltage, as is apparent from FIG. 2, the aperture value at time $t_1$ is accurately obtained but the aperture value at time $t_2$ is offset from the proper value by an amount corresponding to the differential voltage $V''t_2 - \Delta V'$. The present invention adopts a voltage proportional to the secondary differentiation value of the metering voltage, instead of the constant voltage $\Delta V'$, so that the correction voltage is increased by an amount corresponding to the sharp variation of the metering voltage, as compared with the prior art. The result is that an approximately proper aperture may be obtained even at time $t_2$.

Figure 3:
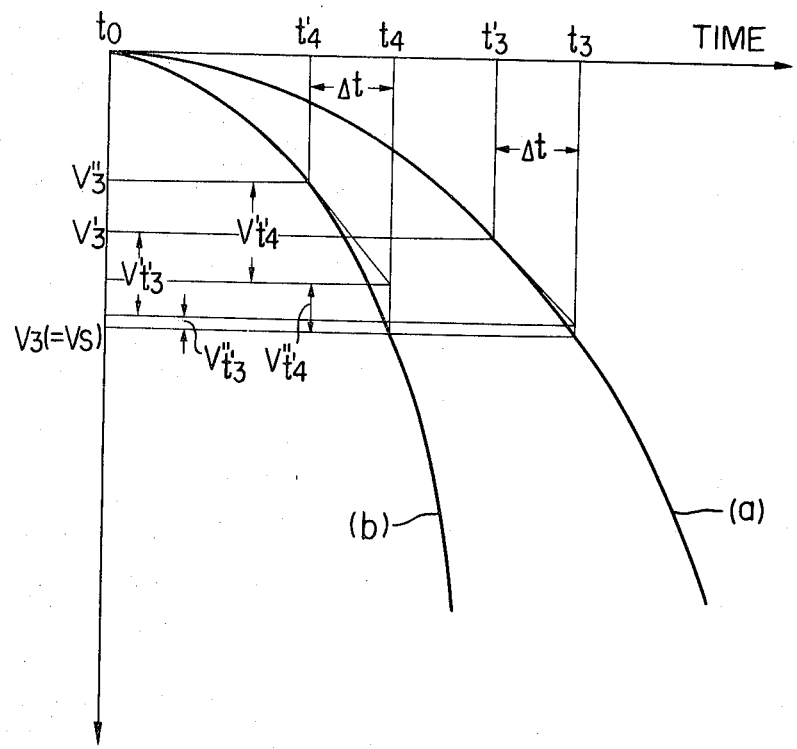

Reference is now had to FIG. 3 to describe an application of the present invention to a camera of the type in which the photographic lens is interchangeable. FIG. 3(a) is the metering output of a standard lens, for example, and FIG. 3(b) is the metering output of a photographic lens having the same aperture value as the standard lens but having a smaller aperture diameter. In FIG. 3(a), if it is assumed that a proper aperture value is obtained at time $t_3$ whereat the metering voltage has become $V_3=(VS)$, then the comparator circuit 6 produces a signal for driving the electromagnet Mg at time $t'_3$ earlier by the delay time $\Delta t$ than time $t_3$. It will be understood from the fact that the differential voltage $V'_3-V_3$ between the metering voltage $V_3$ at time $t_3$ and the metering voltage $V'_3$ at time $t'_3$ is substantially equal to the sum voltage $V't'_3+V''t'_3$ of the voltage $V't'_3$ proportional to the primary differentiation value of the metering output at time $t'_3$ and the voltage $V''t'_3$ proportional to the secondary differentiation value of the metering output at time $t'_3$. Likewise, in FIG. 3(b), it will be understood from the fact that the sum voltage $V't'_4+V''t'_4$ of the voltage $V't'_4$ proportional to the primary differentiation value of the metering output at time $t'_4$ earlier by the delay time $\Delta t$ than the time $t_4$ whereat the metering voltage has become $V_3$ and the voltage $V''t'_4$ proportional to the secondary differentiation value is substantially equal to the differential voltage $V''_3-V_3$ between the metering voltage $V''_3$ at time $t'_4$ and the metering voltage $V_3$ at time $t_4$. In the prior art device, it is apparent that an aperture error corresponding to the voltage $V''t'_4-V''t'_3$ occurs.

Figure 4:
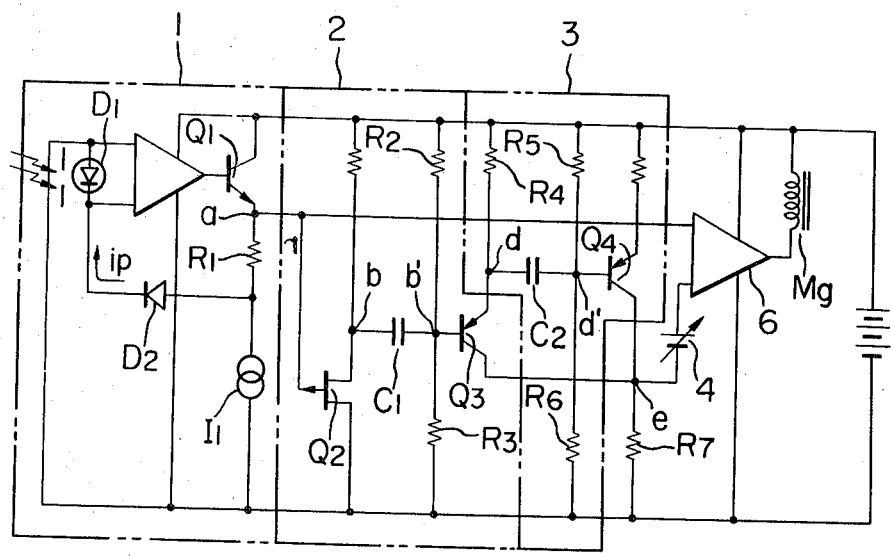
FIG. 4 is a detailed circuit diagram of the diaphragm aperture control device shown in FIG. 1.

FIG. 4 shows an example of the circuit resulting from the block diagram of FIG. 1. In FIG. 4, the object light passed through the aperture opening of the photographic lens impinges on a photodiode $D_1$. Because of this, a photocurrent Ip flows in the photodiode $D_1$ through a transistor $Q_1$, a resistor $R_1$ and a diode $D_2$. This causes a voltage proportional to the logarithm of the brightness of the object light to be produced at a junction a. Since a constant current flows to the resistor $R_1$ by a constant current source $I_1$ while being superposed on the photocurrent Ip, the voltage at the junction a actually becomes higher by this amount. The elements mentioned above constitute a metering circuit 1.

The voltage at the junction a is applied to the gate of a field effect transistor $Q_2$. The potential at the junction a is in phase with the voltage at a junction b. The voltage at the junction b is primary-differentiated by a capacitor $C_1$ and resistors $R_2$, $R_3$ and applied to the base of a transistor $Q_3$. This transistor $Q_3$ converts the primary-differentiated voltage applied to the base thereof into a current and flows the same to junctions d and e. The elements mentioned just above constitute the primary differentiation circuit 2.

The voltage at the junction d produced by the emitter current of the transistor $Q_3$ and the resistance value of the resistor $R_4$ corresponds to the primary differentiation voltage. This primary differentiation voltage is secondary-differentiated by a capacitor $C_2$ and resistors $R_5$, $R_6$ and applied to the base of a transistor $Q_4$ through a junction d'. The secondary differentiation voltage applied to the base of the transistor $Q_4$ is converted into a current by the transistor $Q_4$ and flows into a junction e. What has been described above constitutes the secondary differentiation circuit 3.

The collector currents of the transistors $Q_3$ and $Q_4$ are added together at the junction e and flow to a resistor $R_7$. Thus, an addition voltage corresponding to the primary differentiation voltage and the secondary differentiation voltage is produced at the junction e. Therefore, the level of the set voltage of the setting circuit with respect to the ground voltage is increased by an amount corresponding to the addition voltage.

The comparator circuit 6 receives as input the voltage at the junction a and the set voltage whose level has been increased, and demagnetize the electromagnet Mg when these inputs have assumed a predetermined relation.

Now, when stop down is effected by release operation, the quantity of light impinging on the photodiode $D_1$ is gradually decreased so that the voltage at the junction a is varied as shown in FIG. 2. Therefore, the gate voltage of the transistor $Q_2$ is also decreased and accordingly, the voltage at the junction b is also decreased. Such variation is transmitted through the capacitor $C_1$ to the junction b' between the resistors $R_2$ and $R_3$ and there is produced a primary differentiation voltage corresponding to the time differentiation of the variation of the gate voltage of the transistor $Q_2$. Since the transistor $Q_3$ receives a voltage corresponding to this time differentiation as its base, the emitter current and the collector current are varied to a value corresponding thereto. Accordingly, the voltage produced at the junction d by the resistor $R_4$ and the emitter current of the transistor $Q_3$ corresponds to the primary differentiation voltage. The voltage variation at the junction d is transmitted through the capacitor $C_2$ to the junction d' between the resistors $R_5$ and $R_6$ and there is produced a secondary differentiation voltage which is a further differentiated primary differentiation voltage. The collector current of the transistor $Q_4$ to the base of which is applied the secondary differentiation voltage corresponds to the secondary differentiation voltage.

Since the collector currents of the transistors $Q_3$ and $Q_4$ are added together at the junction e and flow to the resistor $R_7$, the voltage produced thereat corresponds to the sum of the primary differentiation voltage and the secondary differentiation voltage. Therefore, one input voltage of the comparator circuit 6 is increased over the set voltage VS by an amount corresponding to the primary differentiation voltage and the secondary differentiation voltage. That is, the time whereat the electromagnet Mg is demagnetized earlier by that amount. In the manner described above, the intended aperture control is accomplished.

In the above-described embodiment, the electromagnet is demagnetized when the relation that $V=VS+V'+V''$ (equation (2)) is established among the metering voltage V, the voltage V' proportional to the primary differentiation value of the metering voltage V, the voltage V'' proportional to the secondary differentiation value of the metering voltage V, and the set voltage VS, but as will be apparent if the equation (2) is modified, the electromagnet may be demagnetized when the relation that $V-VS=V'+V''$ (equation (3)) is established between the voltage $V'+V''$ which is the primary differentiation voltage V' plus the secondary differentiation voltage V'' and the voltage $V-VS$ which is the metering voltage V minus the set voltage VS. Further, it will be readily seen that by modifying the equation (2), the sum voltage $V'+V''$ of the primary differentiation voltage V' and the secondary differentiation voltage V'' may be subtracted from the metering voltage V and the result may be compared with the set voltage VS. Reference is now had to the block diagram of FIG. 5 to describe the case where the aperture control is effected in accordance with the equation (1). In FIG. 5, those elements functionally similar to those in FIG. 1 are given similar reference numbers. The metering voltage V of the metering circuit 1 is applied to the primary differentiation circuit 2 and a subtraction circuit 41. The output V' of the primary differentiation circuit 2 is applied to the secondary differentiation circuit 3 and an adder circuit 40. Since the output V" of the secondary differentiation circuit 3 is further applied to the adder circuit 40, the output of the adder circuit 40 becomes V'+V". On the other hand, the set output VS of the setting circuit 4 is further applied to the subtraction circuit 41, so that the subtraction circuit 41 puts out an output V−VS. The comparator circuit 42 compares the output of the subtraction circuit 41 with the output V'+V" of the adder circuit 40 and demagnetizes the electromagnet Mg when the two voltages become equal to each other.

As has been described above, the aperture control device of the present invention can accomplish suitable automatic aperture control without effecting combersome circuit adjustment for various photographic lenses differing in the metering output and the characteristic of the aperture stop down time.

What I claim is:

1. An automatic diaphragm aperture control device used with a camera having an objective lens, a diaphragm having a diaphragm aperture, a shutter mechanism and a shutter speed selecting mechanism, said device including:
   (1) means for stopping down the diaphragm from its open position prior to the commencement of exposure in association with a shutter releasing operation;
   (2) light measuring means for measuring the light passing through the objective lens the diaphragm aperture and for producing an output signal indicative of such measurement;
   (3) output means providing an output signal commensurate to a shutter speed selected by the shutter speed selecting mechanism;
   (4) locking means for determining a diaphragm aperture by locking said means for stopping down the diaphragm so as to stop its stopping down operation;
   (5) correction signal generating means putting out a primary differentiation signal resulting from the time-differentiation of the output signal of at least said light measuring means; and
   (6) comparator means receiving as input the output signals from said light measuring means, said output means and said correction signal generating means and operating said locking means when said three signals assume a relationship providing a proper diaphragm aperture;
   the improvement residing in that said correction signal generating means further puts out a secondary differentiation signal resulting from secondary time differentiation of the output signal of said light measuring means.

2. A device according to claim 1, wherein said comparator means includes an adder circuit which adds together said primary differentiation signal, said secondary differentiation signal and the output signal from said output means, and said comparator means operates said locking means when the output signal from said adder circuit and the output signal from said light measuring means assume a relationship providing a proper diaphragm aperture.

3. A device according to claim 1, wherein said comparator means including an adder circuit and a subtraction circuit, said adder circuit puts out an addition signal resulting from the addition of said primary differentiation signal and said secondary differentiation signal, said subtraction circuit puts out a subtraction signal resulting from the subtraction of the output signal of said output means from the output signal of said light measuring means, and said comparator means operates said locking means when said addition signal and said subtraction signal assume a relationship providing a proper diaphragm aperture.

* * * * *